United States Patent
Richter

(10) Patent No.: US 7,190,953 B2
(45) Date of Patent: Mar. 13, 2007

(54) METHOD FOR DOWNLOADING AND SELECTING AN ENCODING/DECODING ALGORITHM TO A MOBILE TELEPHONE

(75) Inventor: Thomas Richter, Lauf (DE)

(73) Assignee: NXP B.V., Eindhoven (NL)

( * ) Notice: Subject to any disclaimer, the term of this patent is extended or adjusted under 35 U.S.C. 154(b) by 1102 days.

(21) Appl. No.: 09/795,000

(22) Filed: Feb. 28, 2001

(65) Prior Publication Data

US 2001/0024961 A1   Sep. 27, 2001

(30) Foreign Application Priority Data

Feb. 29, 2000   (DE) ................. 100 09 444

(51) Int. Cl.
- H04Q 7/20   (2006.01)
- H04B 1/38   (2006.01)
- H04B 1/00   (2006.01)
- H04M 3/42   (2006.01)
- H04M 1/00   (2006.01)
- H04M 3/00   (2006.01)

(52) U.S. Cl. ................. 455/419; 455/72; 455/418; 455/466; 455/550.1; 455/517; 455/566

(58) Field of Classification Search ............ 455/71–72, 455/79, 550, 404, 418–420, 69, 88, 466, 455/422.1, 424–425, 550.1, 556.1–556.2, 455/403, 566, 553.1, 557–558, 127.4, 552.1; 370/469, 360, 332–334, 363; 704/201, 221, 704/219, 220, 228; 375/219, 295; 341/50–51
See application file for complete search history.

(56) References Cited

U.S. PATENT DOCUMENTS

| | | | | |
|---|---|---|---|---|
| 5,414,751 A | | 5/1995 | Tamada | 379/58 |
| 5,742,910 A | * | 4/1998 | Gallant et al. | 455/558 |
| 5,855,003 A | * | 12/1998 | Ladden et al. | 704/270 |
| 5,872,775 A | * | 2/1999 | Saints et al. | 370/342 |
| 5,898,696 A | * | 4/1999 | Proctor et al. | 370/468 |
| 6,058,359 A | * | 5/2000 | Hagen et al. | 704/214 |
| 6,167,253 A | * | 12/2000 | Farris et al. | 455/412.2 |
| 6,188,981 B1 | * | 2/2001 | Benyassine et al. | 704/233 |
| 6,208,627 B1 | * | 3/2001 | Menon et al. | 370/328 |
| 6,233,713 B1 | * | 5/2001 | Van Den Berghe et al. | 714/790 |
| 6,240,126 B1 | * | 5/2001 | Ohashi et al. | 375/132 |
| 6,289,037 B1 | * | 9/2001 | Gibbons et al. | 375/130 |
| 6,349,204 B1 | * | 2/2002 | Goetz et al. | 455/419 |
| 6,401,200 B1 | * | 6/2002 | Nishiike et al. | 713/2 |
| 6,424,822 B1 | * | 7/2002 | Mekuria et al. | 455/72 |
| 6,535,497 B1 | * | 3/2003 | Raith | 370/336 |
| 6,587,684 B1 | * | 7/2003 | Hsu et al. | 455/419 |
| 6,636,970 B2 | * | 10/2003 | Akiyama et al. | 713/189 |
| 2002/0071396 A1 | * | 6/2002 | Lee et al. | 370/252 |

FOREIGN PATENT DOCUMENTS

| | | | |
|---|---|---|---|
| JP | 06276317 A | * | 9/1994 |
| SU | 560355 A | * | 7/1977 |
| WO | WO9729606 | | 8/1997 |

* cited by examiner

Primary Examiner—Meless Zewdu

(57) ABSTRACT

A method of operating a mobile telephone that is taken up in a data transmission network, which method involves at least one encoding and decoding algorithm for converting analog speech data into digital data and vice versa; according to this method at least one further encoding and decoding algorithm is transmitted to the mobile telephone via a data transmission link that is established between the mobile telephone and the network, which algorithm is received by the mobile telephone and stored in a non-volatile memory so as to be used for data conversion after the implementation.

7 Claims, 2 Drawing Sheets

METHOD FOR DOWNLOADING AND SELECTING AN ENCODING/DECODING ALGORITHM TO A MOBILE TELEPHONE

The invention relates to a method of operating a mobile telephone that is taken up in a data transmission network, which method involves at least one encoding and decoding algorithm for converting analog speech data into digital data and vice versa.

Customary mobile telephones for digital, cellular networks use an encoding and decoding algorithm for converting analog data and speech data into digital data. Such algorithms are essentially software programs that are subject to rapid further development and improvement. In recent years various protocols have emerged, for example, Full Rate, Half Rate or Enhanced Full Rate. Such protocols are continuously developed further, on the one hand to enable more efficient use of the channel capacities available and to provide improved speech quality on the other hand. For languages with particular tonal features, for example Chinese, it is necessary to use special algorithms that are adapted to the particularities of this language. The development and implementation of such algorithms is very intricate and may take months or even years. The improved algorithms, however, can be used only in new mobile telephones, because the encoding and decoding algorithms form part of the permanently programmed operating system of the mobile telephone that cannot be modified after manufacture. This situation is unsatisfactory both to the customer, because he or she cannot take advantage of the enhanced possibilities, as well as to the manufacturer because it is to be feared that purchasers will have a poor opinion of such mobile telephones.

Therefore, it is an object of the invention to provide a method of operating a mobile telephone of the kind said forth in which said drawbacks are avoided.

In order to achieve this object the method according to the invention is characterized in that at least one further encoding and decoding algorithm is applied to the mobile telephone via a data transmission link established between the mobile telephone and the network, which algorithm is received by the mobile telephone and stored in a non-volatile memory so as to be used for data conversion after the implementation.

Customary mobile telephones are conceived for operation in digital, cellular networks. It is standard to provide such telephones with a given encoding and decoding algorithm during their manufacture, each time a current standard being used for this purpose. As soon as a new, improved standard becomes available, it can be applied to the mobile telephone and stored in a non-volatile memory. According to the invention the user is given a possibility for selecting either the new or the old algorithm. When the new algorithm is selected, this encoding and decoding algorithm will subsequently be used for the conversion of the speech data; use can be made of matching coding and decoding algorithms only. The user can make a selection between the various algorithms either directly after the downloading of the new algorithm or can change algorithms at a later instant. For example, it may be that a higher data transmission rate with an improved speech quality is offered at a higher price, or that a transmission with a reduced channel capacity is accepted in the case of lower quality requirements. When different algorithms are implemented in a mobile telephone, it can also operate in regions in which the current algorithms are not yet available.

In order to establish the data transmission link for the transmission of the encoding and decoding algorithm the network advantageously transmits an SMS message to the mobile telephone, or a direct call is made to the mobile telephone so as to trigger a call from the mobile telephone to the network. The user can thus be simply informed about new possibilities and features. If so desired, the user can download the new algorithm via the network. However, the user may also reject the implementation of new software or accept it at a later instant.

A particularly large field of application is realized when the data transmission link corresponds to the GSM standard, notably the protocols DCS 1800 or PCS 1900. Such a method can be used in practically all mobile telephones in use at present. The method according to the invention can also be used for future further developments of the GSM standard.

Particularly reliable operation is obtained when a test sum is transmitted at the end of the data transmission or after a part of the data transmission, said test sum being compared with a test sum calculated from the transmitted data by the mobile telephone and the data transmission being terminated in the case of identical test sums whereas it is repeated in the case of different test sums. Errors can thus be detected during the data transmission, thus avoiding a program crash due to an incorrectly transmitted algorithm. The complete algorithm is subdivided into various packets for this purpose, each packet being individually transmitted while a test is performed for successful data transmission after each packet. A downloaded algorithm is released for use only if it has been possible to load it without error. Otherwise it is erased and the occupied memory section is released again.

A mobile telephone according to the invention it is particularly advantageous when it includes a non-volatile memory and means for receiving at least one further encoding and decoding algorithm via a data transmission link established between the mobile telephone and the network, and for storing it in the non-volatile memory.

The non-volatile memory in a further embodiment of the invention is constructed as an EEPROM or FlashPROM. Such memories provide protection of the data that is independent of the battery of the mobile telephone, said data also being preserved in the absence of power supply.

Particularly attractive are mobile telephones which include means for switching over between the encoding and decoding algorithms, each time a given encoding and decoding algorithm being activated. This function can be integrated in the operating system of the mobile telephone in that upon switching on it is determined which encoding and decoding algorithms are available. These algorithms are displayed to the user who must then decide on a given encoding and decoding algorithm. The desired algorithm is selected by a menu so as to be activated. It may also be arranged that for the selection the user is shown only the algorithms that are supported by the network in which the mobile telephone is taken up at the relevant instant.

Further advantages and details of the invention will become apparent from the embodiment to be described hereinafter with reference to the Figures. The Figures are diagrammatic representations.

Figure 1:
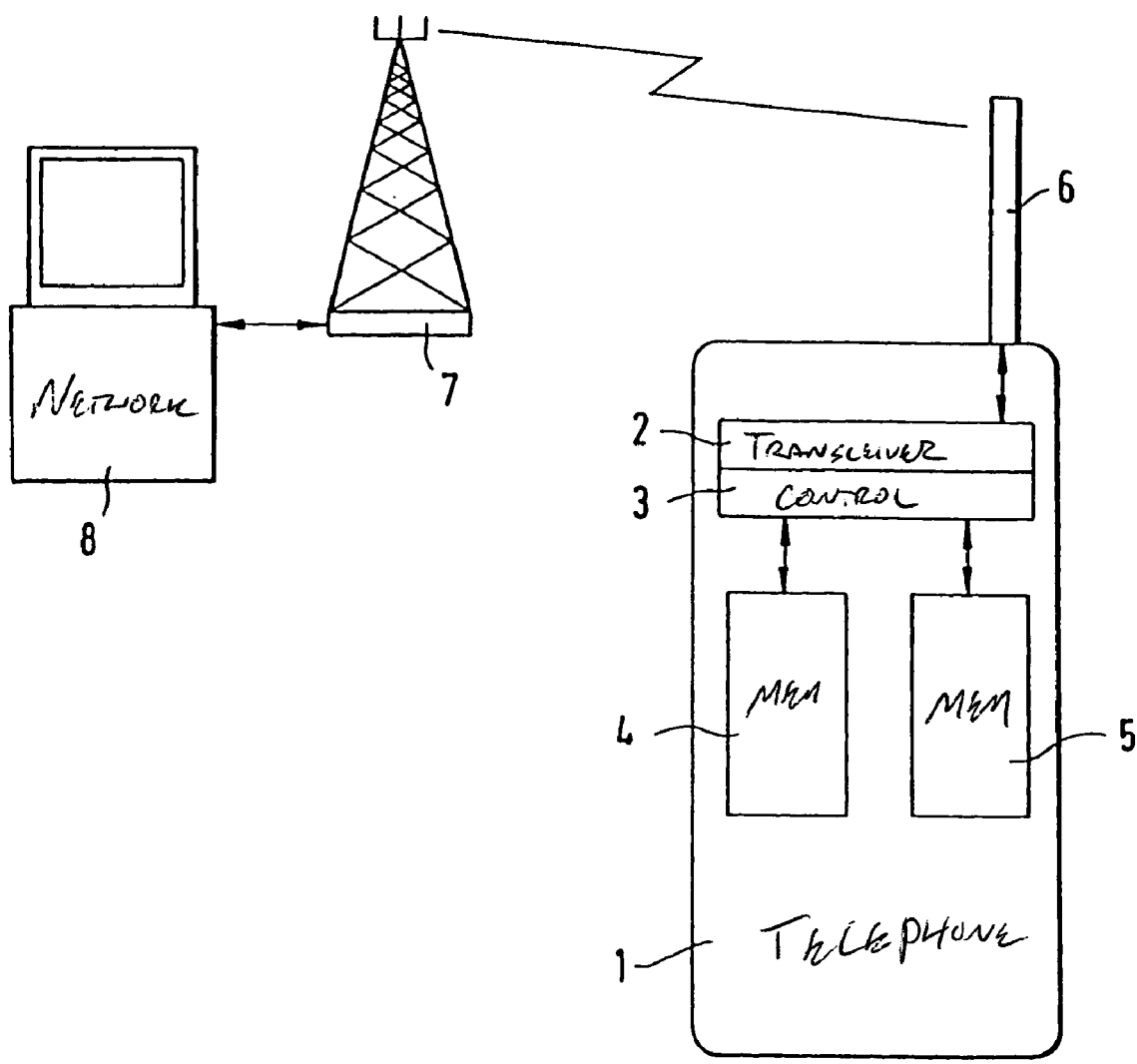
FIG. 1 shows a mobile telephone according to the invention in the presence of a data transmission link with the network.

FIG. 1 shows diagrammatically a mobile telephone 1 with a transmitter/receiver unit 2, a control unit 3, a first memory 4 as well as a second memory 5. The mobile telephone 1 is in radio contact with a transmitter/receiver station 7 of a network via an antenna 6. The transmitter/receiver station 7 is connected to a network computer 8. The memories 4, 5 can be constructed so as to be separate but a single memory may also be subdivided into several sections.

In order to establish a data transmission link for the transmission of the encoding and decoding algorithm, the network computer 8 transmits an SMS message to the mobile telephone 1 via the transmitter/receiver station 7; in response thereto a call from the mobile telephone 1 to the network is initiated. A data transmission link is then established between the mobile telephone 1 and the network computer 8. The network computer 8 transmits the new encoding and decoding algorithm, via the transmitter/receiver station 7, to the mobile telephone 1 which receives the signals via its antenna 6 and conducts the signals to the transmitter/receiver unit 2. The control unit 3 checks which of the memories 4 or 5 can be used for storing the encoding and decoding algorithm. For example, when the memory 4 is activated at the relevant instant, the newly downloaded algorithm is stored in the memory 5. Should the memory 5 be occupied, this memory section is erased and enabled again for writing. Alternatively, the encoding and decoding algorithm can also be stored in another free memory section. The data transmission takes place in packets, a test sum being applied to the mobile telephone 1 by the network computer 8 after each partial transmission. Independently therefrom the control unit 3 of the mobile telephone 1 also calculates a test sum which is compared with the test sum transmitted by the network computer 8. The two test sums are identical in the case of an error-free data transmission. Otherwise the mobile telephone 1 requests the network computer 8 to repeat the data transmission. When the encoding and decoding algorithm has been transmitted to the mobile telephone 1 without any errors, the user is informed accordingly by way of a message in the display of the mobile telephone 1. The user can make a selection between the old algorithm in the memory 4 and the new algorithm in the memory 5 via the operating menu of the mobile telephone 1, be it that each time only a single algorithm may be activated. When the user decides to use the new algorithm, the control unit 3 activates the memory 5 and at the same time deactivates the memory 4. For further calls the new encoding and decoding algorithm in the memory 5 is used.

Figure 2:
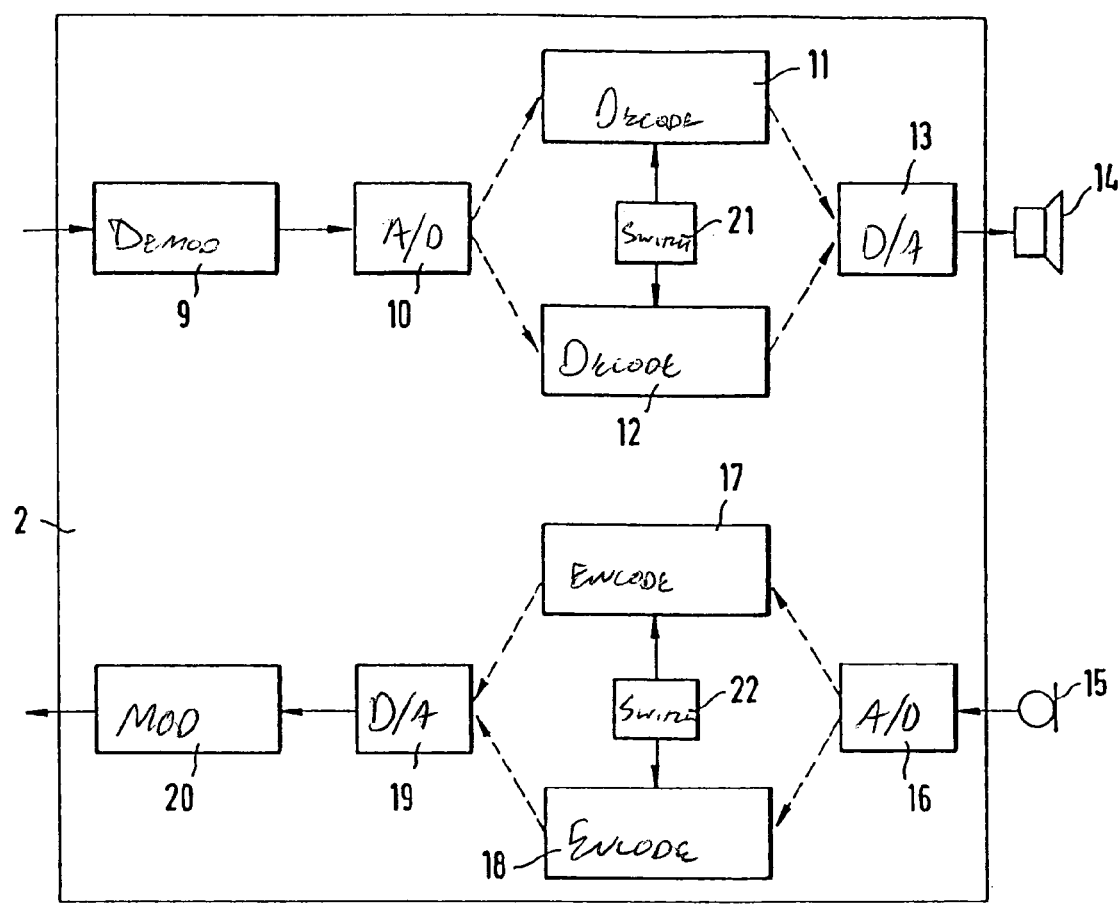
FIG. 2 shows a diagram illustrating the conversion of radio waves into speech signals and vice versa.

FIG. 2 shows diagrammatically the transmitter/receiver unit 2. It includes a demodulator 9 which converts the analog radio waves into electric signals which are subsequently converted into digital signals by an analog-to-digital converter 10; such digital signals are processed further by one of the decoders 11, 12. The decoder 11 utilizes the encoding and decoding algorithm stored in the memory 4. The encoding and decoding algorithm used in the decoder 12 is stored in the memory 5. Switching over between the decoders 11 and 12 takes place via means 21. The digital data is further processed by the decoder associated with the encoding and decoding algorithm in the instantaneously active memory. When the memory 5 is activated, the decoder 12 will be used. The decoder contains the speech algorithm used to convert the radio signals into speech data. The converted signals are applied to a digital-to-analog converter 13 which converts the digital signals into analog signals. The analog signals are output via a loudspeaker 14 that is integrated in the mobile telephone 1.

The reverse procedure takes place when the user speaks into a microphone 15 of the mobile telephone 1. The analog sound waves are applied from the microphone 15 to the A/D converter 16 so as to be converted into digital signals. Together with the selected decoder 11 or 12, the matching encoder 17 or 18 is also activated. Via the means 22, which may be, for example, a software-controlled switching over, each time one of the encoders 17 or 18 is selected. The digital signals are converted by the encoder in such a manner that they can be transmitted by radio. To this end, the conversion into analog signals takes place in a digital-to-analog converter 19 and the further processing takes place in a modulator 20. The modulator 20 provides the radio transmission via the antenna 6 to the transmitter/receiver station 7 and hence to the network computer 8.

The invention claimed is:

1. A method of operating a mobile telephone that is taken up in a data transmission network, which method involves at least one existing encoding and decoding algorithm for converting analog speech data into digital data and vice versa, the method comprising the steps of:
    establishing a data transmission link between the mobile telephone and the data transmission network;
    receiving, by the mobile telephone, a new encoding and decoding algorithm from the data transmission network;
    storing the received new encoding and decoding algorithm in a non-volatile memory located in the mobile telephone;
    displaying and enabling selection, by the user, between the existing or the new encoding and decoding algorithm for data conversion; and
    switching between the exiting and the new encoding and decoding algorithms, dependent upon the algorithm selected.

2. The method of claim 1, wherein the new encoding and decoding algorithm is used as an alternative for the existing encoding and decoding algorithm, and that each time either algorithm can be selected by the user.

3. The method of claim 1, wherein to establish the data transmission link for the transmission of the new encoding and decoding algorithm, the network transmits an SMS message to the mobile telephone or makes a direct call to the mobile telephone in order to initiate a call from the mobile telephone to the network.

4. The method of claim 1, wherein the data transmission link is in conformity with the GSM standard, notably the protocols DCS 1800 or PCS 1900.

5. The method of claim 1, wherein at the end of the data transmission, or after a part of the data transmission, a test sum is transmitted so as to be compared with a test sum calculated by the mobile telephone from the transmitted data, the data transmission being terminated in the case of identical test stuns whereas it is repeated in the case of different test sums.

6. A mobile telephone including at least one existing encoding and decoding algorithm for converting analog speech data into digital data and vice versa, comprising:
    a non-volatile memory;
    means for receiving at least one new encoding and decoding algorithm via a data transmission link established between the mobile telephone and the network;
    means for storing said new encoding and decoding algorithm in the non-volatile memory;
    means for displaying and enabling the user to select either the existing or the new encoding and decoding algorithm for data conversion; and
    means for switching between the exiting and the new encoding and decoding algorithms, depended upon the algorithm selected.

7. The mobile telephone of claim 6, wherein the non-volatile memory is constructed as an EEPROM or Flash PROM.

* * * * *

UNITED STATES PATENT AND TRADEMARK OFFICE
CERTIFICATE OF CORRECTION

| | |
|---|---|
| PATENT NO. | : 7,190,953 B2 |
| APPLICATION NO. | : 09/795000 |
| DATED | : March 13, 2007 |
| INVENTOR(S) | : Richter |

It is certified that error appears in the above-identified patent and that said Letters Patent is hereby corrected as shown below:

In The Claims

In Column 4, Line 44, in Claim 5, delete "stuns" and insert -- sums --, therefor.

Signed and Sealed this
Third Day of May, 2016

Michelle K. Lee
*Director of the United States Patent and Trademark Office*